(12) United States Patent
Lim

(10) Patent No.: US 7,961,903 B2
(45) Date of Patent: Jun. 14, 2011

(54) HANDWRITING STYLE DATA INPUT VIA KEYS

(75) Inventor: Heon Min Lim, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 11/339,171

(22) Filed: Jan. 25, 2006

(65) Prior Publication Data

US 2007/0173240 A1    Jul. 26, 2007

(51) Int. Cl.
*G06K 9/00* (2006.01)
*H04M 3/00* (2006.01)

(52) U.S. Cl. ........................................ 382/100; 455/418

(58) Field of Classification Search .................... 341/22; 345/171; 382/186, 100; 400/110; 707/535; 455/418
See application file for complete search history.

(56) References Cited

U.S. PATENT DOCUMENTS

| | | | |
|---|---|---|---|
| 5,187,480 A | 2/1993 | Thomas et al. | |
| 5,982,303 A | 11/1999 | Smith | |
| 6,362,752 B1 * | 3/2002 | Guo et al. | 341/28 |
| 6,837,633 B2 | 1/2005 | Lorenzo | |
| 7,277,732 B2 * | 10/2007 | Chen et al. | 455/566 |
| 2002/0145592 A1 * | 10/2002 | Schauer | 345/156 |
| 2003/0006956 A1 * | 1/2003 | Wu et al. | 345/156 |
| 2004/0018858 A1 * | 1/2004 | Nelson | 455/566 |
| 2004/0121817 A1 * | 6/2004 | Tng et al. | 455/566 |
| 2005/0027524 A1 * | 2/2005 | Wu et al. | 704/235 |
| 2005/0273332 A1 * | 12/2005 | Scott et al. | 704/247 |
| 2007/0115146 A1 * | 5/2007 | Jo | 341/22 |

FOREIGN PATENT DOCUMENTS

WO    WO 03/029952    4/2003
WO    WO 2007/087033    8/2007

* cited by examiner

*Primary Examiner* — Brian P Werner
*Assistant Examiner* — Nirav G Patel
(74) *Attorney, Agent, or Firm* — Woodcock Washburn LLP

(57) ABSTRACT

The subject disclosure pertains to an input system and method. Patterns can be received with respect to one or more keys. Based in part on selected keys, a pattern can be identified or inferred. Accordingly, a user is able to gesture over or with respect to a keypad to input data. More particularly, data can be entered by handwriting or drawing patterns representing characters, among other things, utilizing keys or like mechanisms.

14 Claims, 20 Drawing Sheets

P

X

AC00                             Hangul Syllables                           ACFF

|   | AC0 | AC1 | AC2 | AC3 | AC4 | AC5 | AC6 | AC7 | AC8 | AC9 | ACA | ACB | ACC | ACD | ACE | ACF |
|---|---|---|---|---|---|---|---|---|---|---|---|---|---|---|---|---|
| 0 | 가 | 감 | 갞 | 갰 | 갈 | 갹 | 갰 | 거 | 검 | 겐 | 겠 | 곀 | 겸 | 곘 | 고 | 곰 |
| 1 | 각 | 갑 | 갟 | 갱 | 갉 | 같 | 걐 | 걱 | 겁 | 겠 | 겡 | 격 | 곁 | 곙 | 곡 | 곱 |
| 2 | 갂 | 값 | 갠 | 갲 | 갊 | 갚 | 걑 | 겨 | 겂 | 겐 | 겢 | 겪 | 곂 | 곚 | 곢 | 곲 |
| 3 | 갃 | 갓 | 갡 | 갳 | 갋 | 갛 | 걒 | 걳 | 것 | 겓 | 겣 | 겫 | 곃 | 곛 | 곣 | 곳 |
| 4 | 간 | 갔 | 갤 | 갴 | 갌 | 개 | 갬 | 건 | 겄 | 겔 | 겤 | 겼 | 계 | 곜 | 곤 | 곴 |

Fig. 11

Fig. 12a
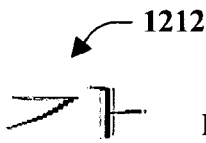 IS A COMBINATION OF  AND
Fig. 12b

HANDWRITING STYLE DATA INPUT VIA KEYS

BACKGROUND

Computers and other processor-based devices receive and process user data. For example, users can compose a letter or email on a computer, call another person on a phone, or select an item for purchase from a vending machine. The fundamental undertaking is transferring a user's thoughts to a device, which can subsequently perform operations based thereon. User data can be provided to a computing device via one or more input devices including a keyboard, mouse, touchpad, touch screen and/or stylus and microphone. The keyboard or keypad is one of the most popular devices due at least to its ease of use, proven reliability, and lack of input ambiguity.

Input methods are software components that construe user operations with respect to input devices such as depression of keys, speaking into a microphone, or writing with a stylus, for instance to generate and provide text input to applications. With respect to a keyboard, characters are conventionally mapped one-to-one with keys for languages with small character sets such as English, Spanish, French and German. The input method therefore simply identifies a character based on selection of a key. For example, a letter "R" can be input by merely depressing the "R" key. However, languages such as Chinese, Japanese and Korean include hundreds and thousands of characters making the one-to-one key-character mapping impractical and impossible with conventional keyboards.

The input method alone or in conjunction with an editor can facilitate receipt of myriad of characters in East Asian languages and the like via a standard keyboard. For instance, characters can be received from the keyboard in a romanized form, and subsequently converted to an intended form. This requires users to memorize which keys correspond to which alternate language element, refer to a reference, and/or employ a modified standard keyboard with alternate language elements represented thereon. Conventionally, several characters are typed and converted in one chunk. Furthermore, conversion may have to be reattempted, as there may be several possible translations. For example, a candidate character(s) can be displayed in an editor as a user types, and the user can accept and/or select an intended translation. This process is known as composition, and the text that the input method receives and works on is called composed text. The process terminates when the user confirms the final conversion result and the text is committed.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation pertains to a handwriting style input method and mechanism over keys. A pattern can be input by drawing a visual representation of the pattern utilizing keypad/keyboard keys. By way of example and not limitation, the pattern can correspond to language characters. Accordingly, rather than memorizing and attempting to depress keys that map to particular characters, these characters can be input by drawing them on keypad. In other words, keys can be selected, in one of a number of different manners, to generate an illustration of the character. Among other things, the innovation can make entry of East Asian characters much easier to accomplish and also make such input possible on keyboards with small key sets including but not limited to mobile phones.

According to an aspect of the subject innovation, an input recognition system is provided that includes an input component and an analyzer component. In brief, the input component can acquire data corresponding to an entered pattern, for instance from a keypad. The analyzer component can receive or retrieve the data from the input component and identify the corresponding pattern attempted to be entered.

The analyzer component can include, among other things, a sequence detector component and mapping component in accordance with other aspects of the innovation. The sequence detector component can facilitate delimiting patterns, strokes and the like. The sequence data associated with a pattern can be provided to the mapping component to identify the specified pattern or a number of patterns likely to have been specified based on the input.

The subject innovation also supports default and custom pattern entry shortcuts. These shortcuts can facilitate expeditious pattern specification by limiting the number of keys that are required to be selected to specify a pattern. The short cuts can be housed in a map and utilized by the mapping component to identify input patterns.

In accordance with another aspect of the subject innovation, the input recognition system is coupled to an interface component. Hence, the identified patterns or corresponding images or version thereof can be displayed to a user. Furthermore, where there is ambiguity with respect to the entered pattern a user can be presented with numerous likely matches based on context information, among other things. The user can then select the pattern he/she attempted to input.

According to another aspect of the innovation, a persistence component can be coupled to the input recognition system to enable identified patterns to be saved. For example, the input pattern could be unique like in the case of a signature and be saved to a data store.

A translation component could also be coupled to the input recognition system according to yet another aspect of the subject innovation. Accordingly, a user could draw a character or sequence thereof representing a word in a first language and the translation component can translate the character or word to one or more identified target languages.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 11 is a table of Hangul syllables.

FIG. 12a is a table of all consonants and vowels for the Korean language.

FIG. 12b is illustrates an exemplary Hangul syllable composition.

DETAILED DESCRIPTION

Figure 1:
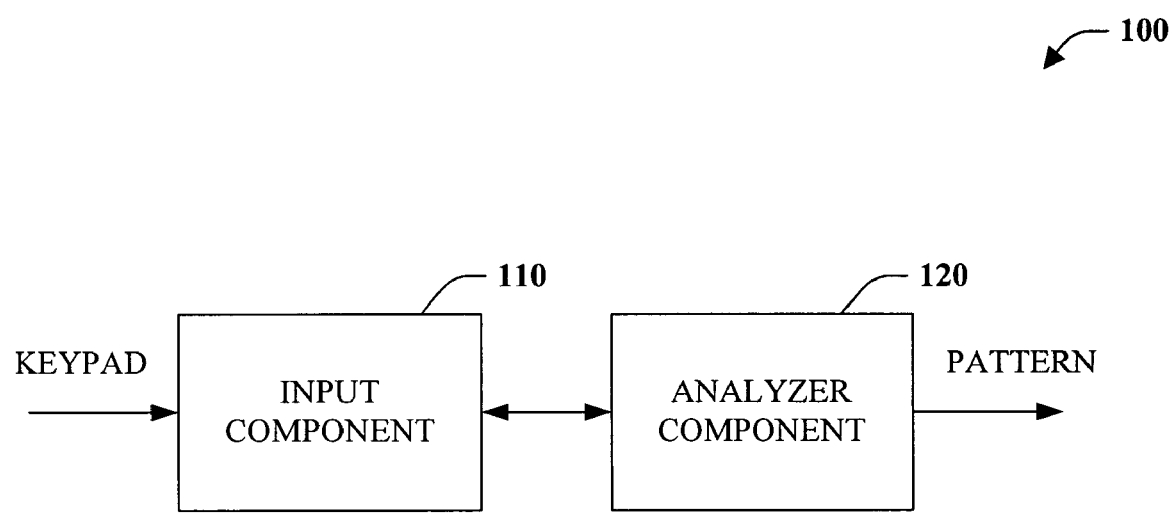
FIG. 1 is a block diagram of an input recognition system.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

It should be appreciated that the words "keyboard," "keypad," "key" or the like are not meant to refer to any specific implementation thereof unless specifically specified. These terms can refer to such elements or portions thereof with respect to multiple devices including computers, mobile phones, vending machines, numeric door locks and digital radios, amongst others. Accordingly, a keyboard or keypad can have any number and type of keys. Furthermore, keys can be selected or activated in a variety of manners not just upon physical depression. For example, keys can be activated by alternate means such as by heat or non-contact motion including but not limited to pointing and gazing. A keypad or keyboard can correspond broadly to a collection of selectable, disparate regions or keys that are conventionally mapped to one or more specific values.

The word "exemplary" is used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relative portion thereof in any manner. It is to be appreciated that a myriad of additional or alternate examples could have been presented, but have been omitted for purposes of brevity.

Artificial intelligence based systems (e.g., explicitly and/or. implicitly trained classifiers) can be employed in connection with performing inference and/or probabilistic determinations and/or statistical-based determinations as in accordance with one or more aspects of the subject innovation as described hereinafter. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Turning initially to FIG. 1, an input recognition system 100 is illustrated in accordance with an aspect of the subject innovation. System 100 includes an input component 110. Input component 110 receives, retrieves or otherwise obtains or acquires data from a keypad. The data can correspond to a sequence of one or more keypad values selected by a user, for example. These values can describe or capture a particular pattern such as an image, character or the like drawn or input with respect to a plurality of keys. In essence, input is depicted with respect to one or more keys of a keypad rather than selecting one or more keys that map to specific values.

Figure 2A:
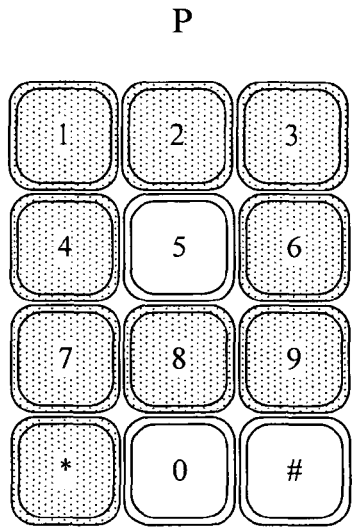
FIGS. 2a-d illustrate exemplary keypad entries.
Figure 2B:
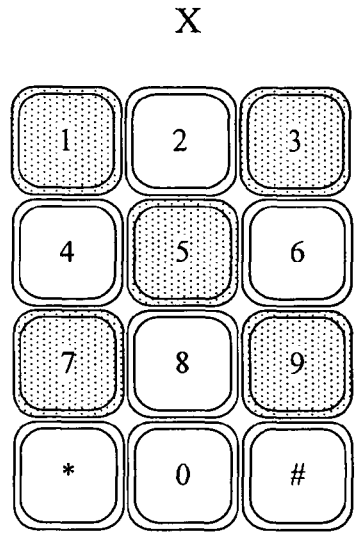
Figure 2C:
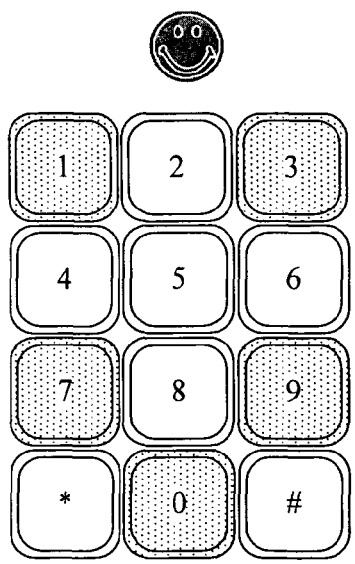
Figure 2D:
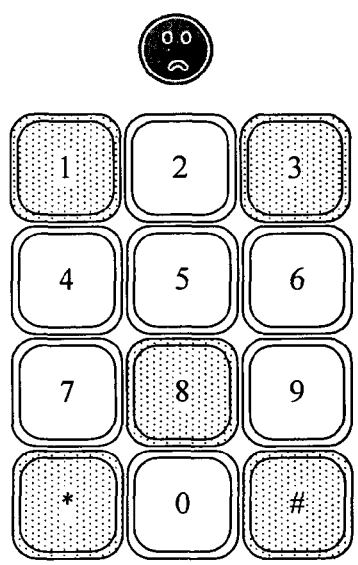

By way of example and not limitation, consider a standard 3×4 mobile phone keypad 200a-d as shown in FIG. 2a-d. To input the letter "P" as shown in FIG. 2a, keys 1, 2, 3, 4, 6, 7, 8, 9 and * can be selected. Similarly, to input the letter "X," keys 1, 5, 9, 3 and 7 can be identified as illustrated in FIG. 2b. Additionally, emoticons such as smiley face or frowning face may be input with the selection of keys 1, 3, 7, 9, and 0 or 1, 3,*, 8 and # as depicted by the keypads 200c and 200d of FIGS. 2c and 2d, respectively.

Returning to FIG. 1, the system 100 also includes an analyzer component 120 communicatively coupled to the input component 110. The analyzer component 120 can receive, retrieve or otherwise acquire data from the input component 110. Component 110 can scrutinize or analyze the data to identify gesture patterns input by a user. For example, analyzer component 110 can receive a sequence of numbers such 1, 3, 7, 9 and 0 and identify that input as a smiley face. An identified pattern value can be output for use by other components. However, the input need not identify a particular pattern. For instance, the pattern may represent a person's signature. In such a scenario, the output can be the received numerical sequence or an image capturing the input.

Figure 3:
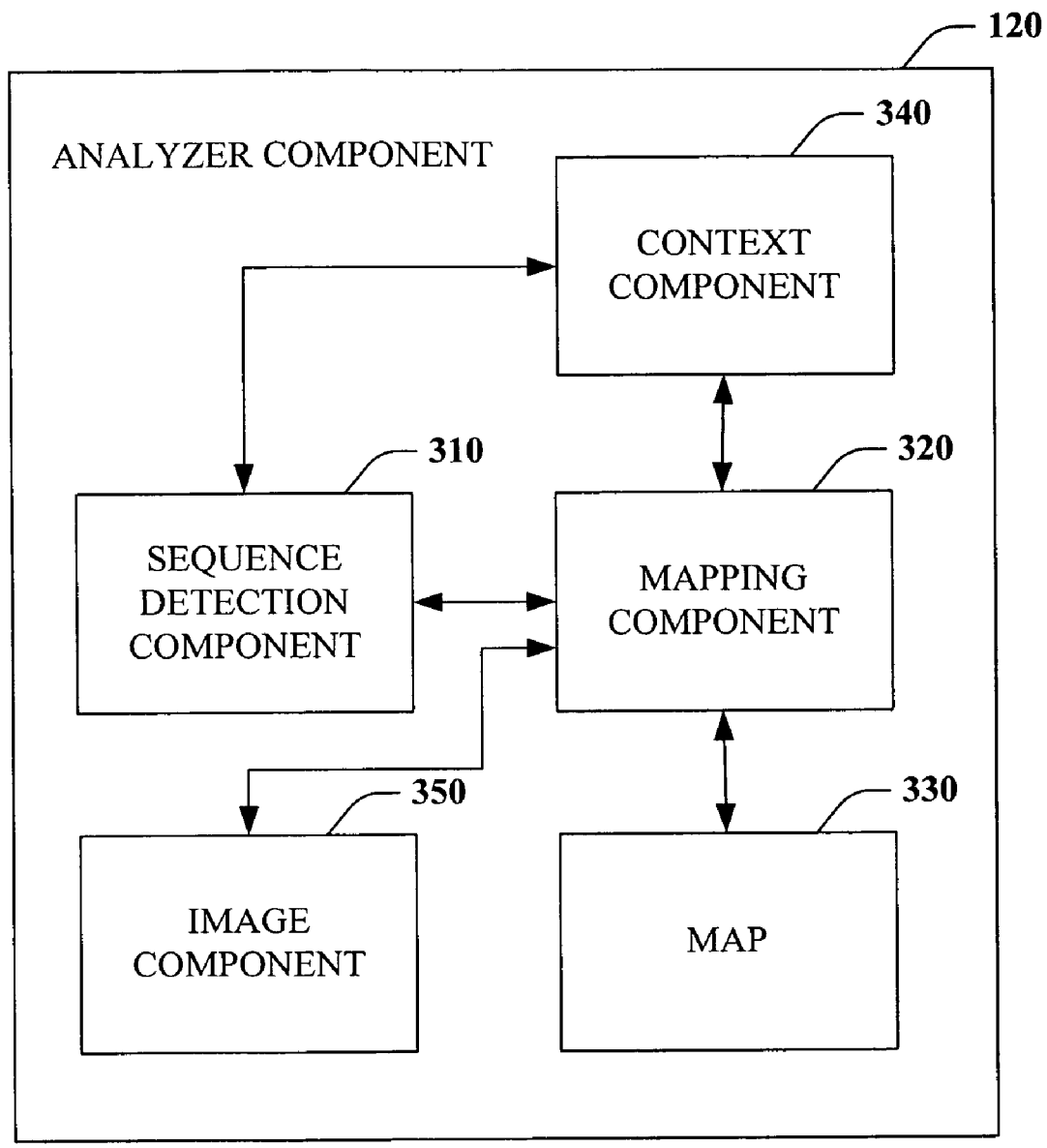
FIG. 3 is a block diagram of an analyzer component.

FIG. 3 illustrates an analyzer component 120 in accordance with an aspect of the subject innovation. As mentioned supra, the analyzer component 120 can analyze received data to detect or identify a pattern such as an image, character or the like. The analyzer component 120 can include a sequence detection component 310. The sequence detection component 310 can identify pattern boundaries. Pattern boundaries divide a first pattern from a second pattern. For instance, sequence detection component 310 can differentiate a gesture pattern sequence input of a letter "C" from a second pattern sequence identifying the letter "D." Additionally or alternatively, the sequence detection component can identify and distinguish input strokes belonging to the same or different pattern. The functionality provided by sequence detection component 310 can be accomplished in one or more disparate manners.

Figure 4:
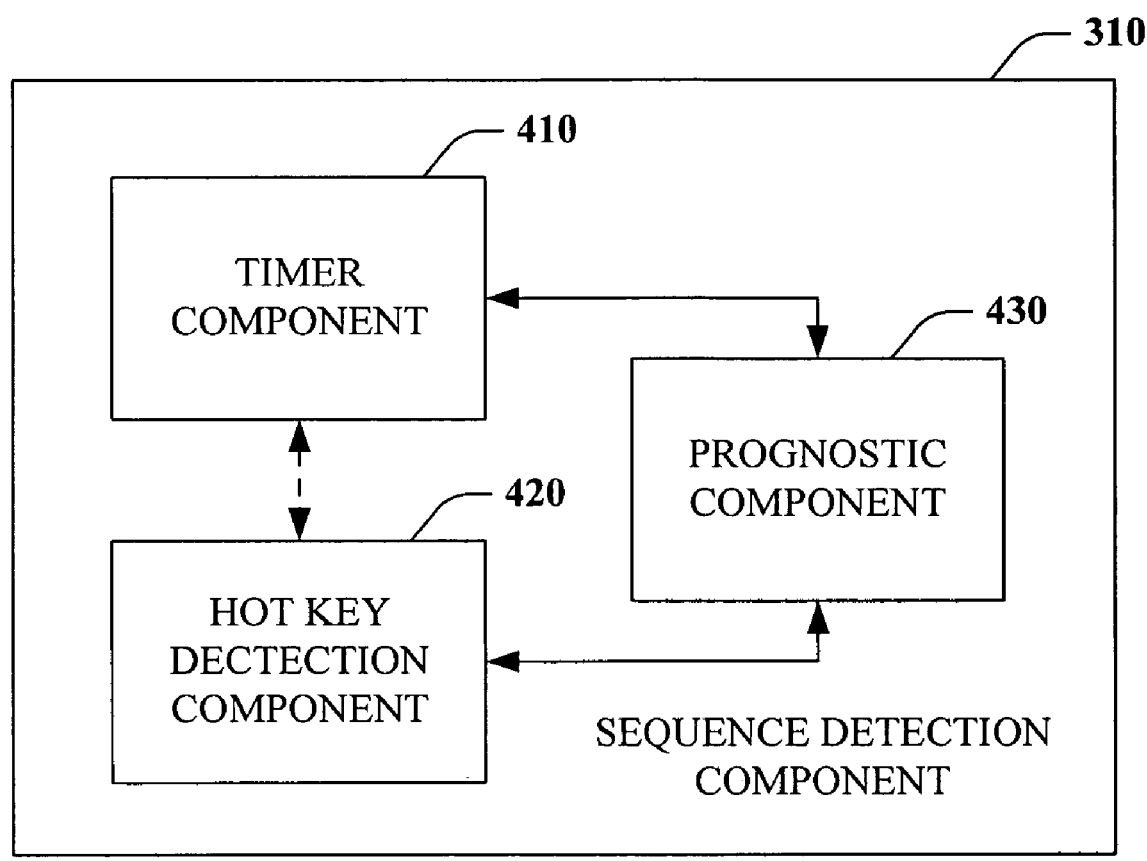
FIG. 4 is a block diagram of a sequence detection component.

Turning attention briefly to FIG. 4, the sequence detection component 210 is depicted in further detail. As illustrated, the sequence component 210 can include a timer component 410 that detects a pause in the entry of input. For example, when a user draws a pattern over a set of keys, the user will often pause before starting a new pattern. The timer component 410 can detect this pause and thereby identify the boundary between sequences. Likewise, the timer component 410 can use similar means to identify and group strokes that define a pattern.

Additionally or alternatively, the sequence detection component 310 can include a hot key detection component 410 separate from or communicatively coupled to the timer component 410. In accordance with an aspect of the subject innovation, a user may select or activate a particular hot key to indicate that a pattern is about to been entered and/or has been completed. For example, the user may select the "*" key once to specify that a pattern will be entered and select the "*" key twice to indicated that the pattern has been completely entered. Accordingly, hot key detection component 420 can detect the presence of a hot key or hot key sequence in the pattern sequence to identify the boundary between pattern sequences. The timer component 410 and hot key detection component 420 are also able to cooperate to enable boundary detection, for instance the timer 410 can detect a boundary where a user forgets to enter specify a hot key and/or the hot key detection component 420 can initialize the timer component 410 upon detection of a hot key or sequence thereof.

Sequence detection component 310 can also include a prognostic component 430. The prognostic component 430 can predict or infer (as that term is defined herein) sequence and/or stroke boundaries, for instance based on historical or context information received or retrieved from context component 340 (FIG. 3). Furthermore, the prognostic component 430 can communicate and interact with one or both of timer component 410 and hot key detection component 420. For example, the prognostic component can interact with the timer component 410 to learn user input habits to facilitate identification of sequences.

Returning to FIG. 3, the sequence detection component 310 can provide one or more delimited sequences to mapping component 320. In addition to the sequence detection component 310, mapping component 320 is communicatively coupled to map component 330, context component 340 and image component 350. The map component 330 can include a plurality of sequences and corresponding patterns such as characters, words, icons or the like. The context component 340 can monitor identified patterns and provide information to the mapping component 320 to facilitate identification of a pattern. For example, provided context information can include but is not limited to historical trends and known phrases. The image component 340 can generate an image based on the provided sequence. Upon receipt or retrieval of a sequence from detection component 310, mapping component 320 will attempt to identify the pattern identified by the sequence.

Figure 5:
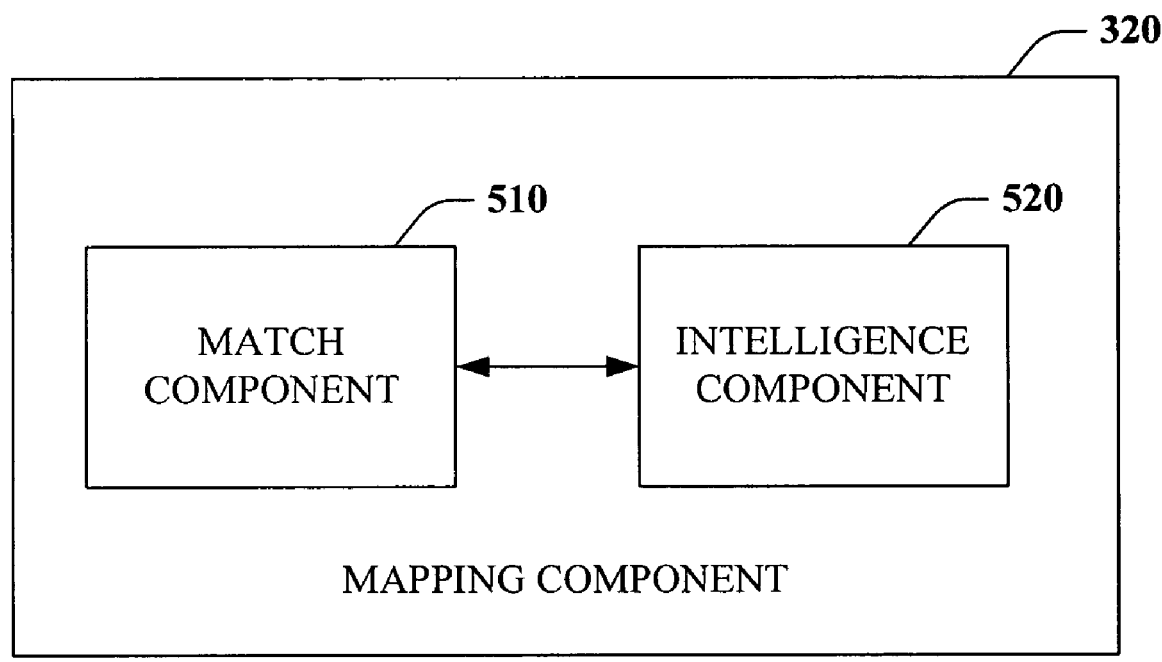
FIG. 5 is a block diagram of a mapping component.

Turning briefly to FIG. 5, the mapping component 320 is illustrated in further detail in accordance with an aspect of the subject innovation. As depicted, the mapping component 320 can include a match component 510 and an intelligence component 520. Match component 510 is a mechanism that can query a map to identify and return a pattern that matches a particular sequence. In a simple case, a provided sequence can simply be matched with a specific pattern as specified in a map such as map component 330 of FIG. 3. However, in some cases, there may not be a clear match based on a corrupted sequence and/or a user input error, for instance. The intelligence component 520 can help in this situation. The intelligence component 520 can aid in selection of one or more patterns likely to have been intended based on the analyzed input. In other words, the intelligence component 520 can infer or predict the likely pattern based on a sequence that does not match a pattern exactly. Such a prediction or inference can be made by the intelligence component 520 based on context information provided from the context component 340 of FIG. 3. Accordingly, mapping component 320 in conjunction with context component 340 can facilitate machine learning such that the mapping component 320 can improve pattern identification over time.

Returning to FIG. 3, it should be appreciated that that the mapping component 320 may also simply desire to generate a pattern based on provided sequence, for example, when such a pattern is not able to be found or inferred within a predetermined degree of confidence, simply on command and/or sua sponte. In such a situation, the mapping component 320 can provide the sequence to the image component 340. This image or pattern can be output rather than or in addition to the sequence where a match is not located, for instance. This may occur where the keypad is used to receive a signature or other type of unique and/or identifying mark.

According to an aspect of the subject innovation, shortcuts are supported. Rather than writing out a complete character, a user may draw a pattern on the keys that utilizes fewer keys, for instance, to facilitate expeditious input. This can be supported via the map component 330. The map component 330 can include an entry for one or more shortcuts. Furthermore, the map component 330 may be accessible for modification such that new shortcuts can be added or patterns changed.

Figure 6:
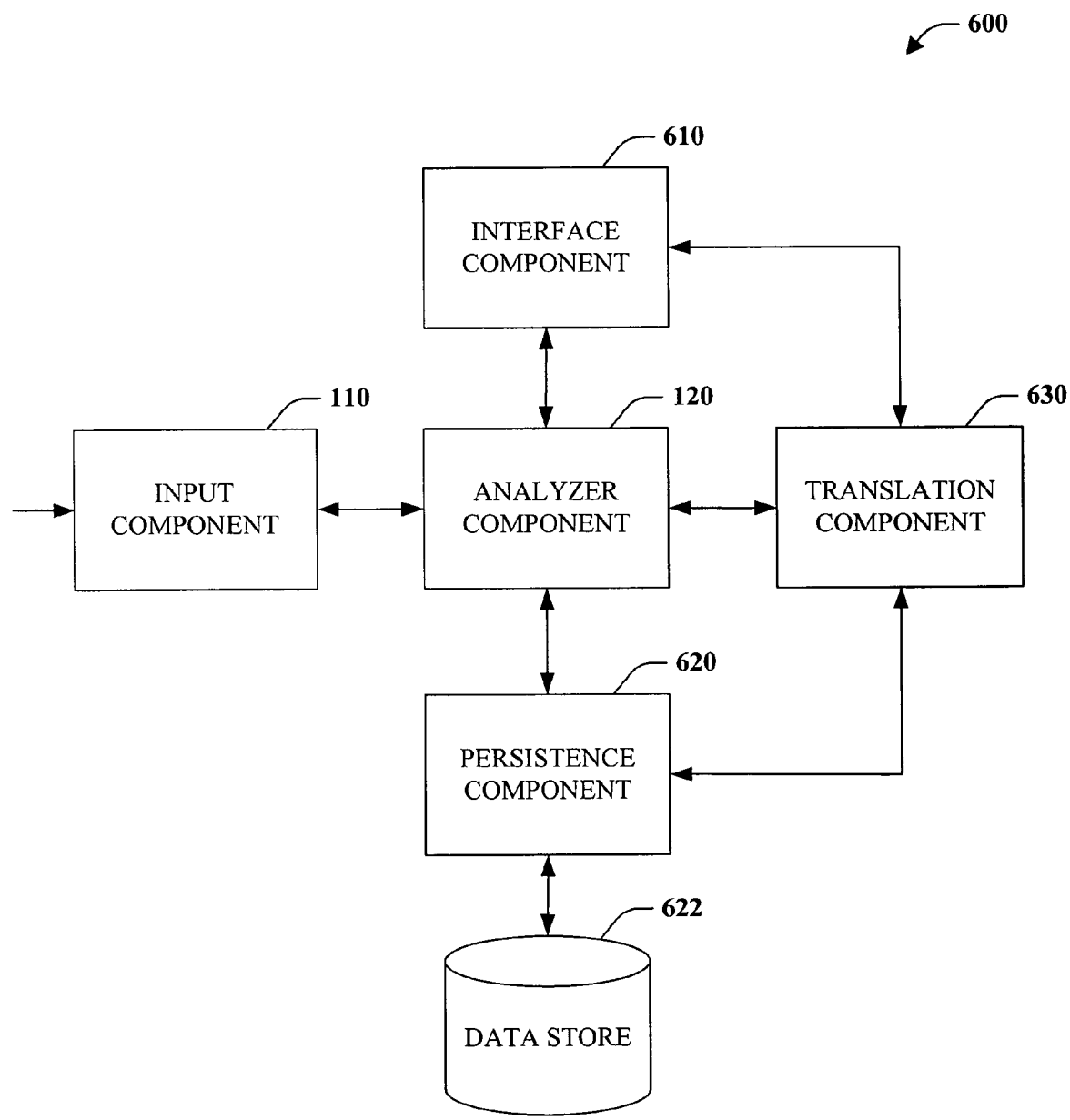
FIG. 6 is a block diagram of an extended input recognition system.

FIG. 6 depicts an extended pattern recognition system 600 in accordance with an aspect of the subject innovation. As with system 100 of FIG. 1, system 600 includes the input component 110 and the analyzer component 120. In brief, the input component 110 acquires data from a keypad or keyboard device. The data represents a pattern including but not limited to characters, icons, and images drawn with respect to the keys on keypad device and can comprise a sequence of characters, numbers or other values conventionally associated with the keys. The analyzer component 120 receives or retrieves the data and attempts to identify the pattern being described thereby. The output of the analyzer component 120 can be provided and employed by one or more components providing specific functionality.

As depicted, system 600 also includes an interface component 610. The interface component 610 is communicatively coupled to the analyzer component 120 and is operable to display patterns provided to it by the analyzer component 120. Additionally, the interface component 610 may receive input from a user with respect to the correct pattern identity and transmit such data back to the analyzer component 120. For example, the interface component 610 can generate or cause to be generated a graphical user interface for display and interaction therewith. In one scenario where there is ambiguity as to the correct pattern, all or a portion of closely related patterns can be displayed, for instance in a drop down menu, for selection by a user.

The system 600 can also include a persistence component 620 communicatively coupled to the analyzer component 120. The persistence component 620 can receive, retrieve or otherwise obtain or acquire pattern data from the analyzer component 120 and persist such data to a data store 622. For instance, where a signature or other identity type pattern is received it may be stored in data store 622 for later use.

The system 600 can also include a translation component 630 communicatively coupled to the analyzer component 120 as well as interface component 610 and persistence component 620. Translation component 630 can receive, retrieve or otherwise obtain or acquire a pattern such character, letter or the like and translate the pattern from a source language to a target language. As will be discussed further infra, the pattern may correspond to a Korean character often called a Hangul. The translation component 630 can translate a Hangul into a Chinese or Japanese character, for example. Translation can be initiated by either the interface component 610 and/or the persistence component 620. Upon initiation, a character pattern can be translated via look up in a map or dictionary, amongst other means or mechanisms.

Figure 7:
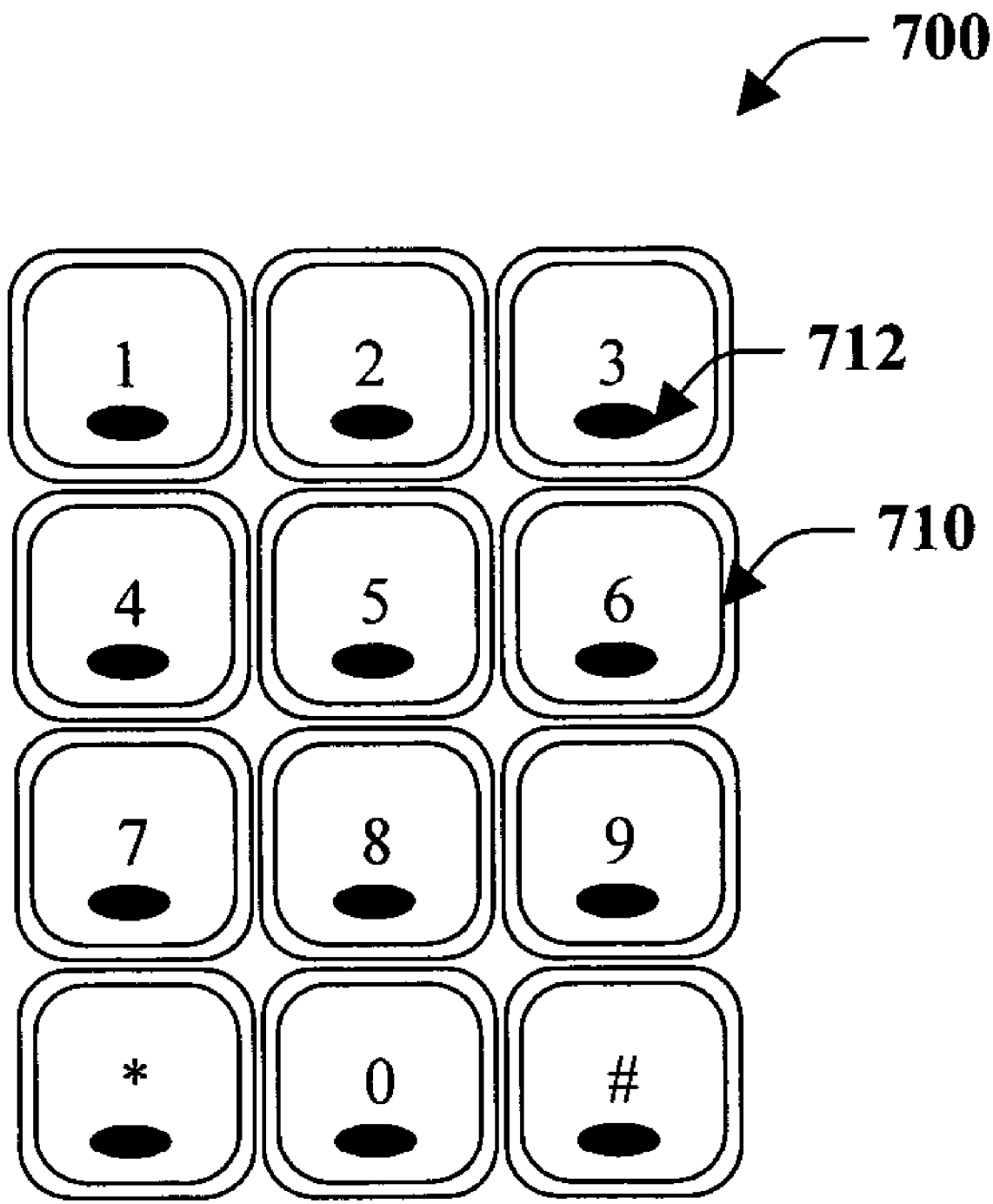
FIG. 7 illustrates an exemplary keypad with sensors.

FIG. 7 illustrates an exemplary keypad 700 in accordance with an aspect of the subject innovation. While data can be entered upon depression of keys, the subject invention is not so limited. Keypad 700 includes a number of keys 710 that include sensors 712. The sensors 712 can be proximity, motion, and heat amongst others. It should also be appreciated that the keys 710 and the sensors 712 can together correspond to a touch screen (e.g., resistive, capacitive, surface acoustic wave . . . ) and like or related technologies. A user can select a plurality keys by drawing or gesturing a pattern on or near the keys. By way of example and not limitation, the keypad 700 enables a user to draw a letter "X" on a 3×4 keypad by running their finger over or substantially close to the keys 1, 5 and 9 and subsequently 3, 5 and 7 resulting in an input sequence of 1, 5, 9, 3, 5, 7 that can be identified by the input recognition system 100 of FIG. 1 as "X."

The aforementioned systems have been described with respect to interaction between several components. It should be appreciated that such systems and components can include those components or sub-components specified therein, some of the specified components or sub-components, and/or additional components. For example, analyzer component 120 can include sequence detection component 310, mapping component 320, map 330, context component 340 and image component 350 or a combination thereof. Sub-components could also be implemented as components communicatively coupled to other components rather than included within parent components. For instance, map component 330 can reside within or outside of analyzer component 120. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, prognostic component 430 and intelligence component 520 can employ such mechanisms to facilitate sequence delimiting and inferring input patterns, respectively.

Figure 8:
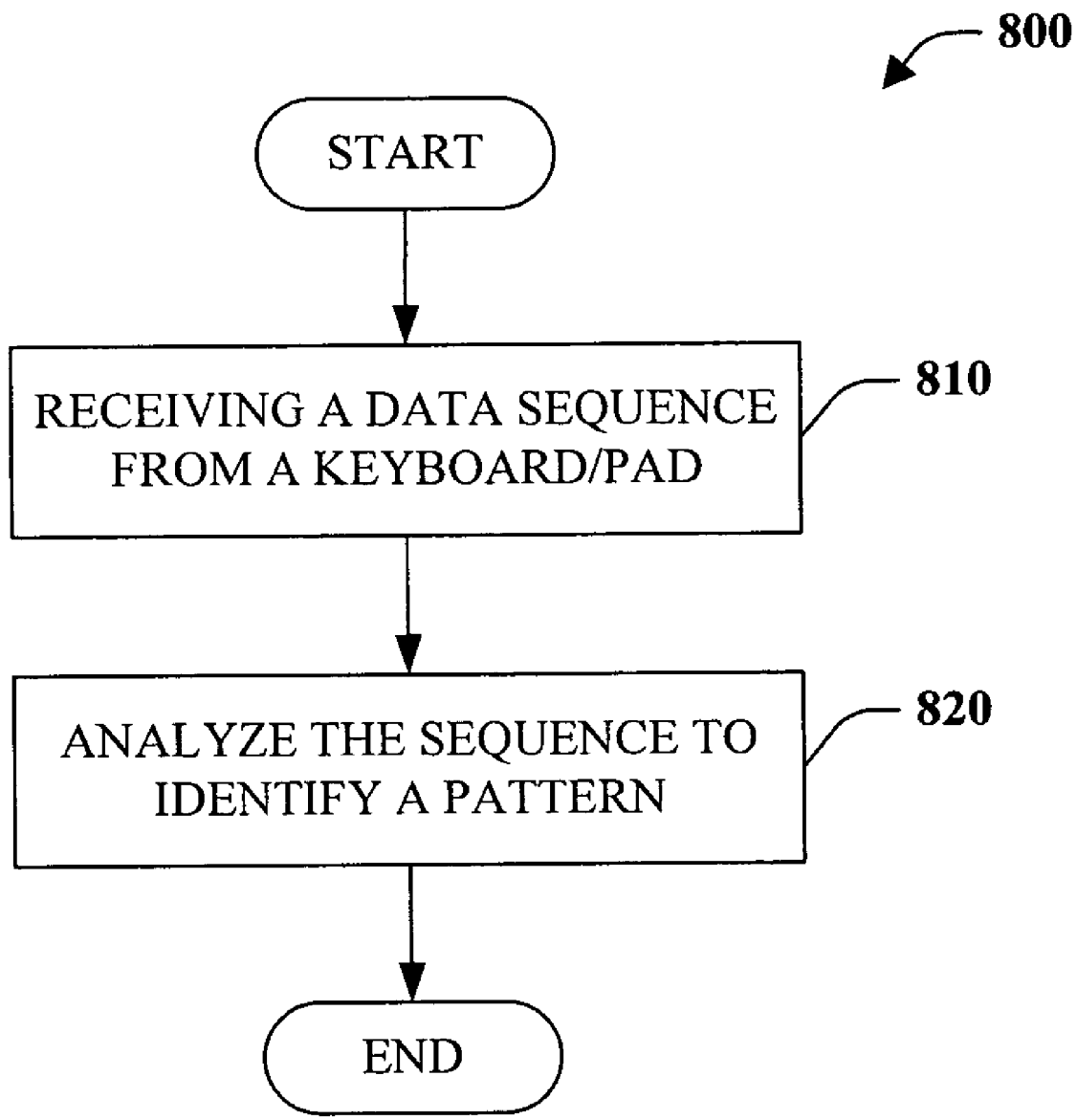
FIG. 8 is a flow chart diagram of an input recognition methodology.
Figure 9:
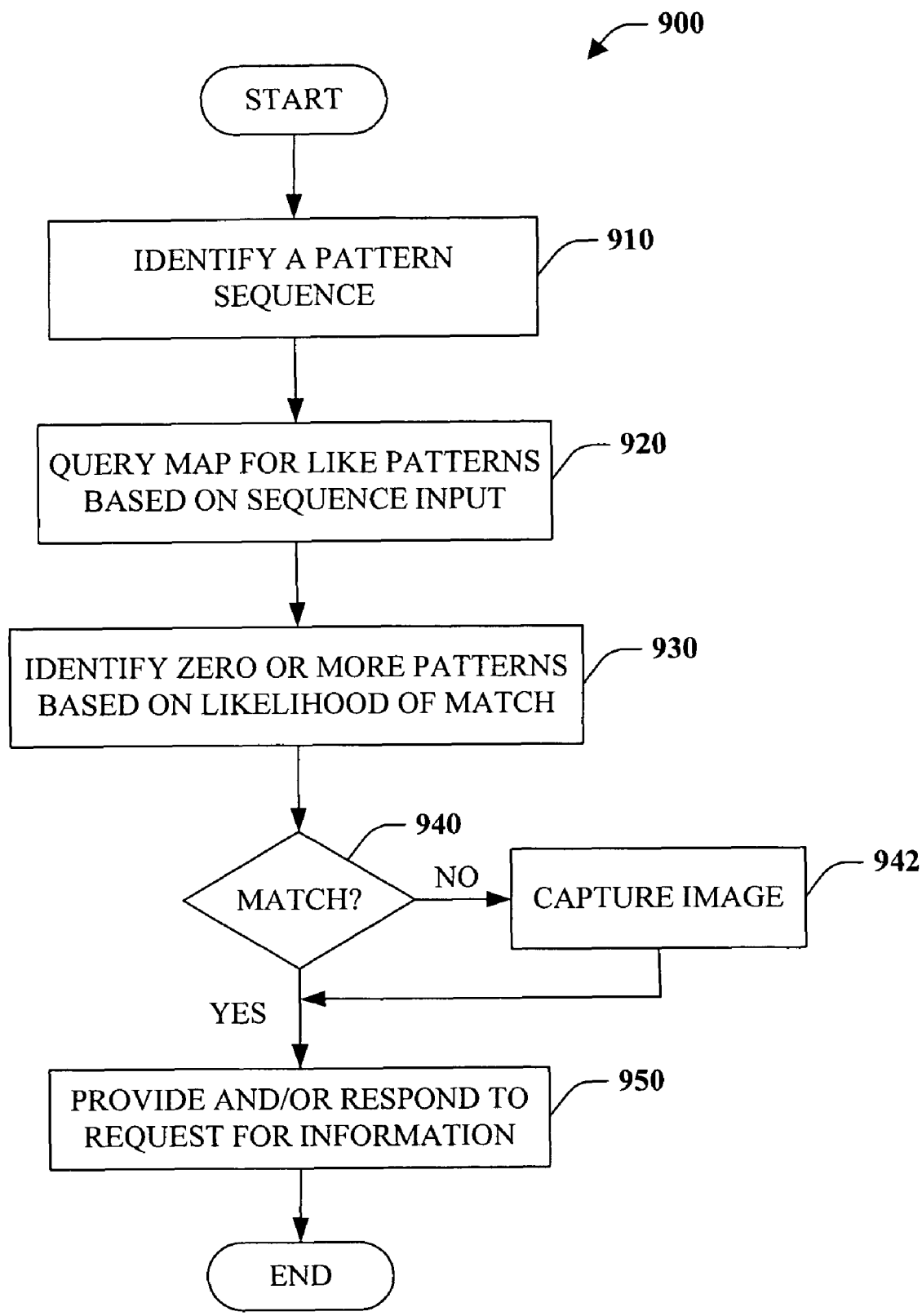
FIG. 9 is a flow chart diagram of an analysis method.
Figure 10:
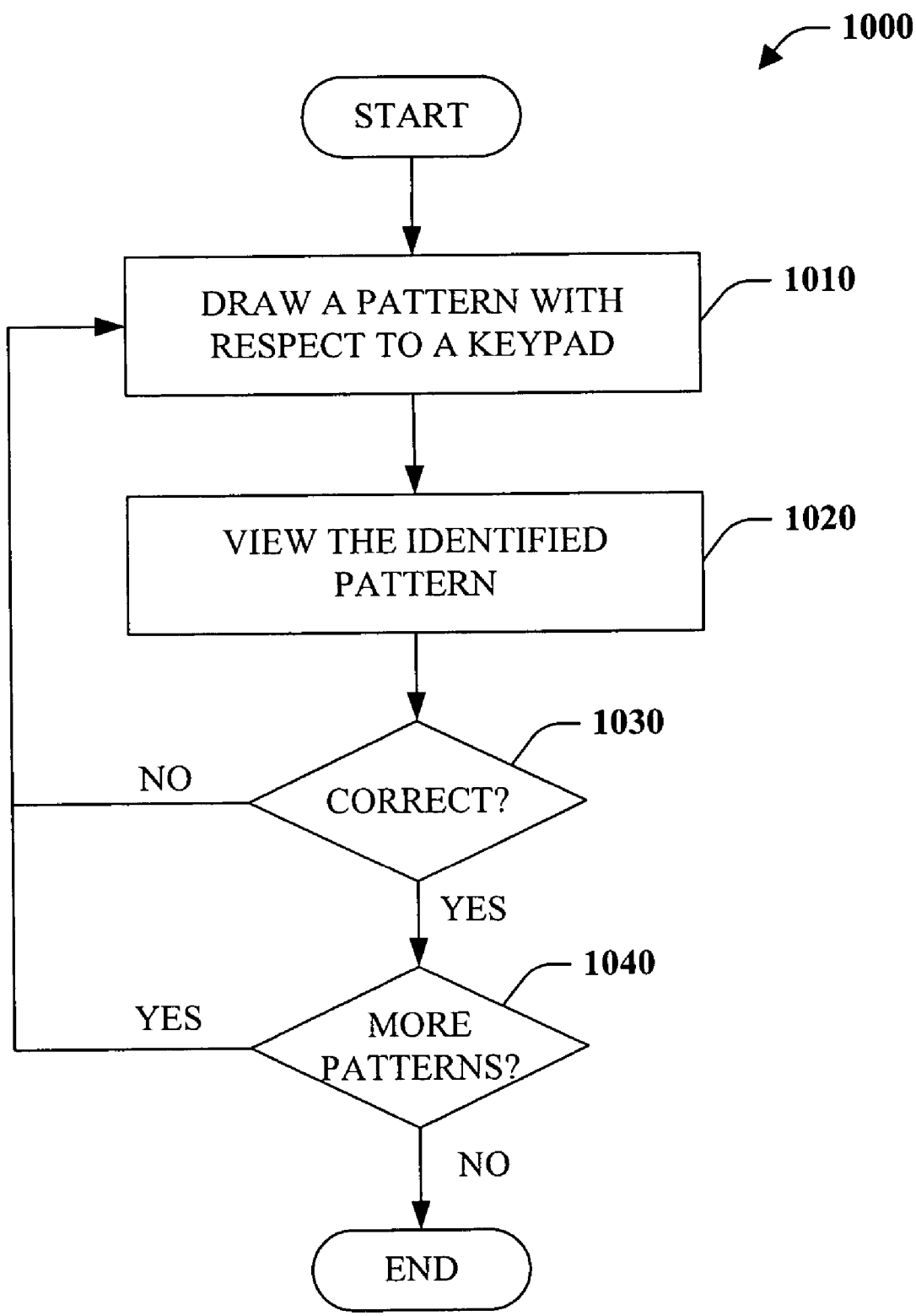
FIG. 10 is a flow chart diagram of a pattern input methodology.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning to FIG. 8, a flow chart of a pattern recognition methodology 800 is illustrated in accordance with an aspect of the subject innovation. At reference numeral 810, a sequence of data is received or retrieved from a keyboard, keypad or like mechanism. For example, data could be obtained from a mobile phone, personal digital assistant (PDA), vending machine, all or a portion of a computer keyboard, amongst others. At reference numeral 820, the sequence data is analyzed to identify a pattern described by the sequence such as but not limited to a character, number, and image.

FIG. 9 illustrates a sequence analysis method 900 in accordance with an aspect of the subject innovation. At reference numeral 910, a pattern sequence is identified. As data is entered, the data representing a pattern sequence, such as the beginning or end of a sequence and/or stroke can be detected. This can be accomplished in numerous ways including but not limited to the use of a timer and/or hot key(s). For example, a timer can be utilized to detect pauses that may indicate the termination of one sequence and the start of another. Additionally or alternatively, one or more hot keys can be detected that indicate the start and/or finish of a pattern sequence. Subsequently or concurrently with sequence detection, the method can proceed to numeral 920.

At reference numeral 920, a pattern map or dictionary can be queried to identify one or more patterns based on the sequence data. The map can include a plurality of sequences and associated patterns. For example, the map can include a sequence of numbers from a keypad that correspond to a character, number or emoticon. It should also be appreciated that the map can include short cut representations of patterns to facilitate expeditious data entry.

Zero or more patterns are identified based on the entered sequence and the likelihood of a match at reference numeral 930. Where a complete sequence is unambiguously received or retrieved, the corresponding pattern may be identified. However, where only part of the sequence is received or where the sequence corresponds to multiple patterns, one or more patterns may be identified base on the likelihood of a match. The likelihood can be determined based on context information such as previously entered and historical data as well as other pattern information such as known phrases, characters and/or images. Accordingly, one or more matches can be inferred or predicted based received sequence data as well as context information.

At reference numeral 940, a determination is made as to whether one or more matches have been found. It should be noted that in certain instance, the subject invention may be utilized simply to retrieve unique pattern data, for example identifying individuals such as via a signature. Hence, the pattern may not be recognizable. In such a scenario, where no match is found or inferred the method can proceed to 942 where the pattern is captured. In particularly, the image drawn or generated with one or more keys can be captured or formed into a picture. Subsequently, the method can proceed to act 950.

At reference numeral 950, pattern data can be provided and/or a response can be made to a request for pattern data. The pattern data can include the pattern such as a character or smiley face, a sequence of pattern data and/or a captured image. For example, the identified pattern can be provided to an interface for display, persistence component for storage and/or a translation component for language translation. Subsequently, the method 900 can terminate.

FIG. 10 is a flow chart diagram of a pattern input methodology 1000 in accordance with an aspect of the subject innovation. At reference numeral 1010, a pattern is drawn with respect to a keyboard, keypad or portion thereof. The pattern can correspond to a character, number, image or the like. The pattern can be drawn by selecting or otherwise identifying appropriate keys to define the pattern with respect thereto. At reference 1020, an identified pattern is viewed. At 1030, a determination is made as to whether the displayed pattern is correct. If it is incorrect then the method can proceed to 1010 where the pattern is re-entered. However, if the pattern is correct then the method continues at 1040 where a determination is made concerning whether there are more patterns to be entered. If yes, then the method proceeds to 1010 and an additional pattern is entered. If no, the method terminates. It should also be appreciated that at 1020 more than one pattern may be displayed for selection based on pattern ambiguity. Accordingly, if the drawn pattern is displayed it can be selected and the method can proceed to reference numeral 1040. If it is not present, then the method can continue as illustrated by reverting back to 1010 where the pattern can be redrawn.

Although not limited thereto, the subject innovation can be employed with respect to East Asian languages including but not limited to Korean. A Korean character often called a Hangul is a combination al character system. The Unicode table 1100 for Hangul syllables is provided in FIG. 11. Each syllable is considered as a single character and is composed of two or three alphabets, for example "Consonant +Vowel" or "Consonant+Vowel+Consonant." Table 1200 of FIG. 12a provides all consonants and vowels in the Korean language.

Figure 13A:
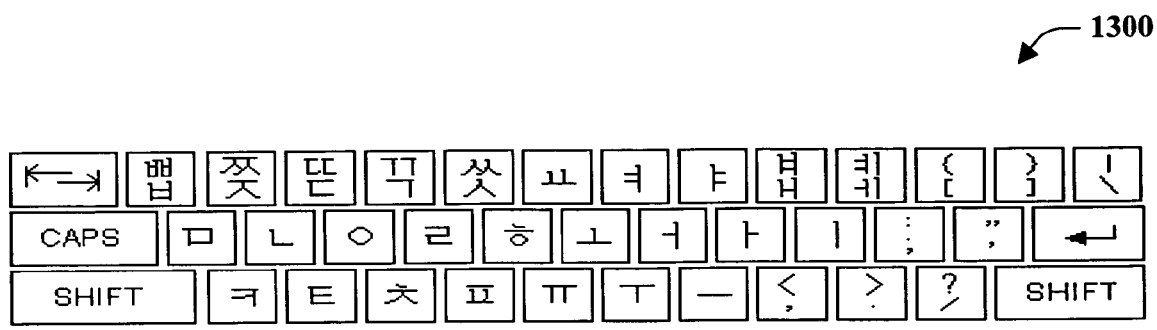
FIG. 13a depicts a keyboard layout for Korean input.
Figure 13B:
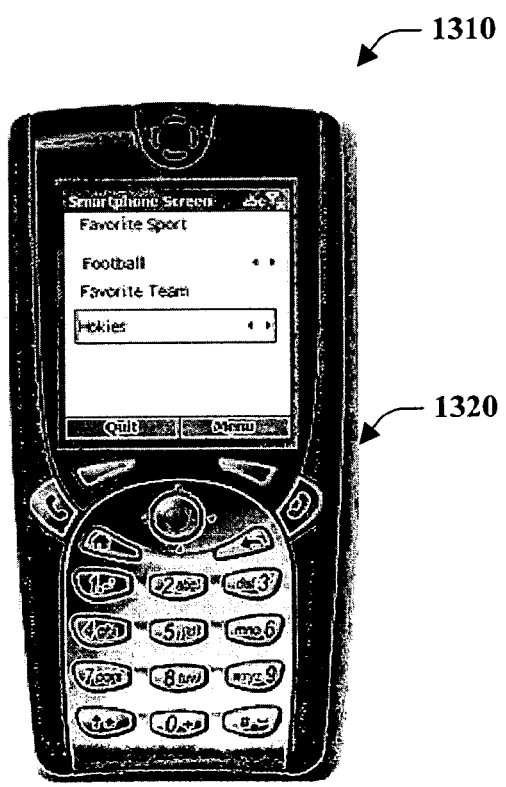
FIG. 13b illustrates a standard mobile phone and keypad.

Turning to FIG. 12b, an exemplary syllable composition 1210 is illustrated. As shown the Hangul syllable 1212 is a combination of components 1214 and 1216. The syllable 1212 could be entered conventionally with a standard computer keyboard and an input method editor (IME) by depressing the "R" key and then the "K" key. A standard keyboard layout 1300 for Korean input via a conventional IME is provided in FIG. 13a. The keyboard layout 1300 includes a complete set for the IME to generate any Korean character. However, consider the mobile phone 1310 of FIG. 13b. There are not enough keys on its 3×4 keypad 1320 for entry of all Korean characters.

Figures 14A, 14B:
FIG. 14a depicts a Korean keyboard layout highlighting the consonants.
FIGS. 14b-d provide a table illustrating drawing sequences for Korean consonants.
Figure 14C:
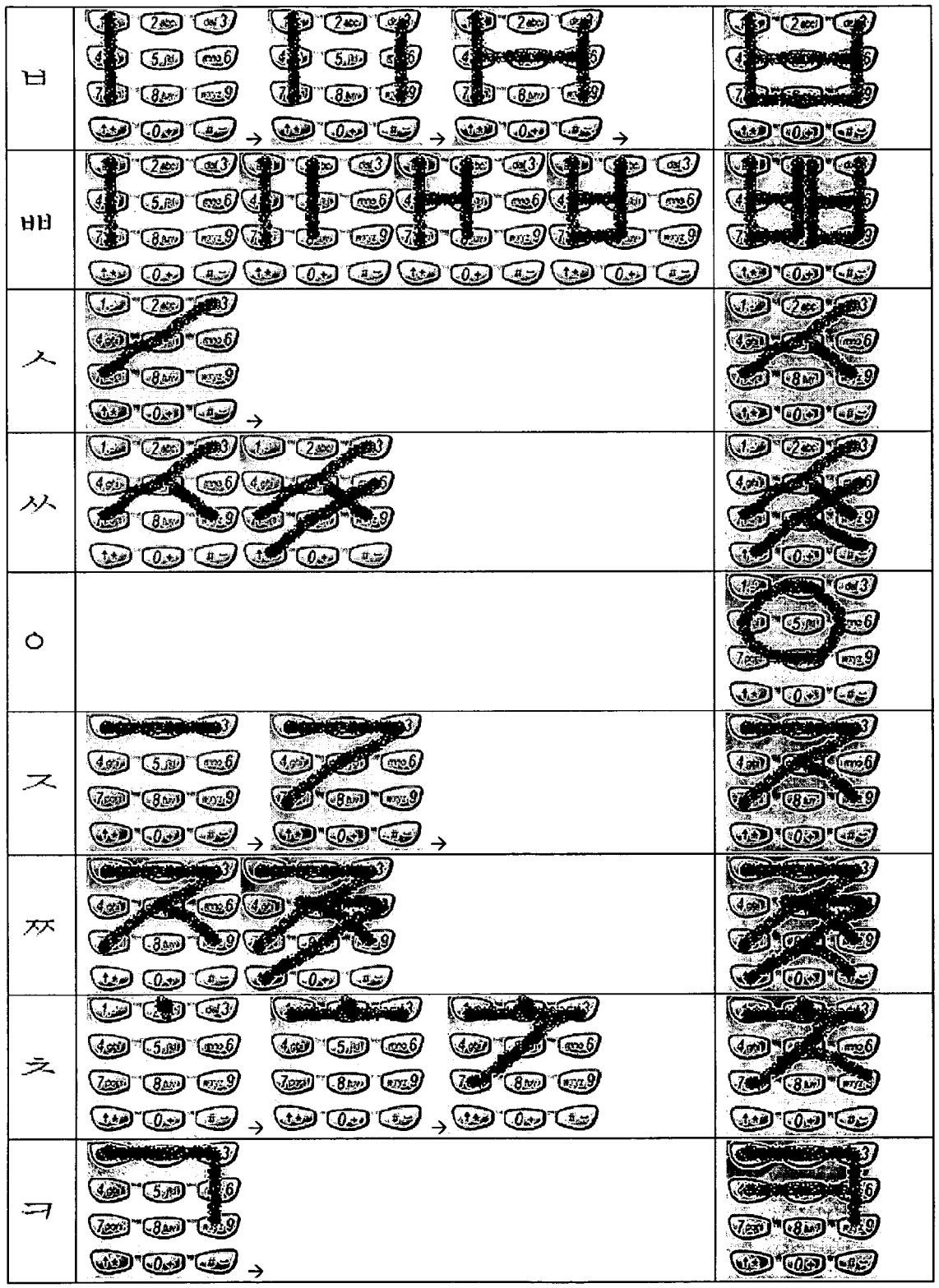
Figure 14D:
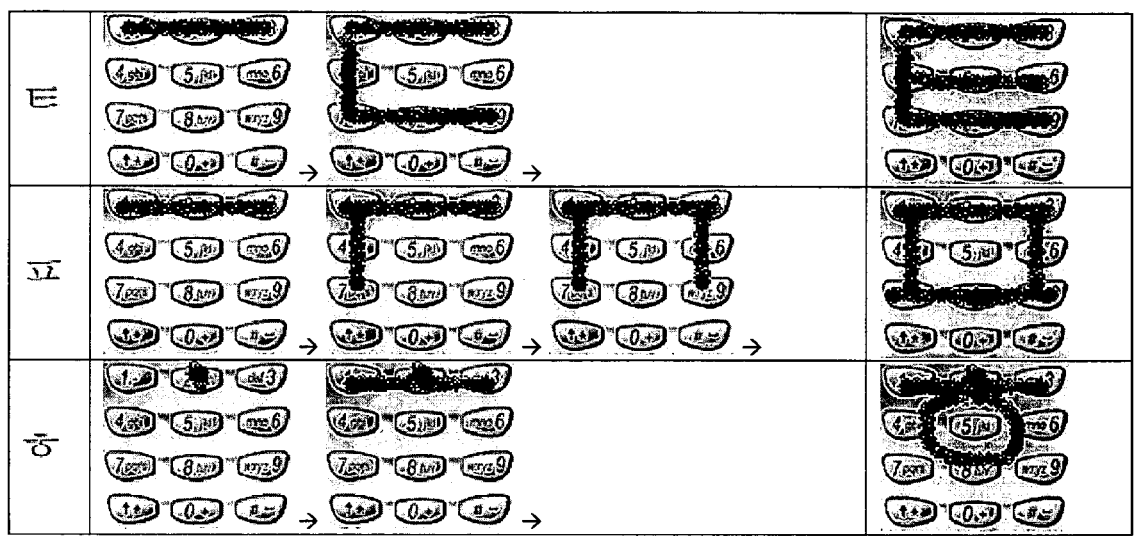

FIG. 14a provides a Korean keyboard layout 1300 with highlighted consonants 1400. One is able to enter each of these eighteen different consonants by drawing a pattern or visual representation of each consonant on the keys. FIGS. 14b-d illustrate portions of a table 1410 that depicts how these consonants can be drawn on a 3×4 keypad such as that of a mobile phone. Row 1414 illustrates the Korean consonant corresponding to the "R" key on the Korean keyboard layout 1300 can be entered in accordance with an aspect of the subject innovation. In particular, a user can select by depression, touch, pointing, gazing or the like the sequence of keys corresponding to 1, 2, 3, 6 and 9. Rows 1414 and 1416 illustrate how to input by drawing the Korean consonant corresponding to the "E" key on the keyboard layout 1300. First, a user can select the keys 3, 2, and 1 to draw a horizontal line. Next, the user can draw a line represented by keys 1, 4, 7, 8 and 9 to complete the "C" like shape. Subsequently, another horizontal line can be drawn by selecting the keys 2 and 3, followed by the keys 2, 5, 8 and 9. Drawings sequences for the remaining consonants are presented in the table 1410 (FIGS. 14b-d) and are self-explanatory in light of the above description.

Figures 15A, 15B:
FIG. 15a illustrates a Korean keyboard layout highlighting the vowels.
FIG. 15b-c provide a table that illustrates the sequences for drawing Korean vowels.
Figure 15C:
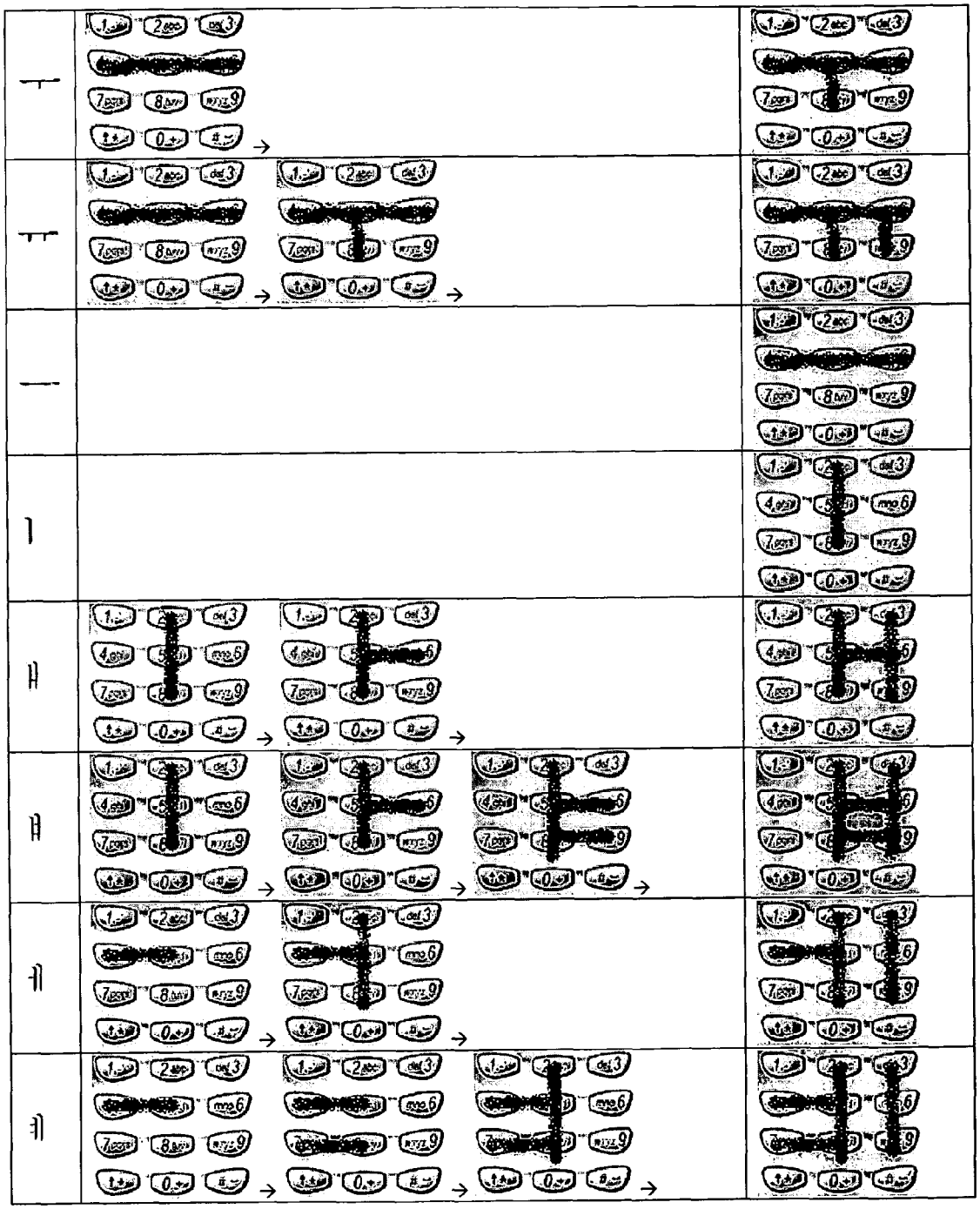

Turning to FIG. 15a, a Korean keyboard layout 1300 is illustrated with the fourteen different Korean vowels 1500 highlighted. FIGS. 15b-c illustrate a table 1510 depicting how the Korean vowels 1500 can be drawn on a 3×4 keyboard. Essentially, the center row keys (4, 5 and 6) and the center column keys (2, 5 and 8) are utilized as horizontal and vertical components of the vowels. For the sake of brevity, each writing sequence in table 1510 will not be described in detail. However, as an example consider row 1512, which describes a drawing sequence that can be employed with to specify the Korean vowel represented by the "L" key on the Korean keyboard layout 1300. In particular, a first vertical line can be drawing by selecting the keys 2, 5 and 8. The final shape can then be generated by drawing the horizontal line by selecting keys 5 and 6.

It should be appreciated that while a portion of this detailed description pertains to specification of Korean characters, the subject innovation is not so limited. The innovation also contemplates other languages, characters, numbers, images, and icons, amongst other things that can be written or drawn.

Figure 16:
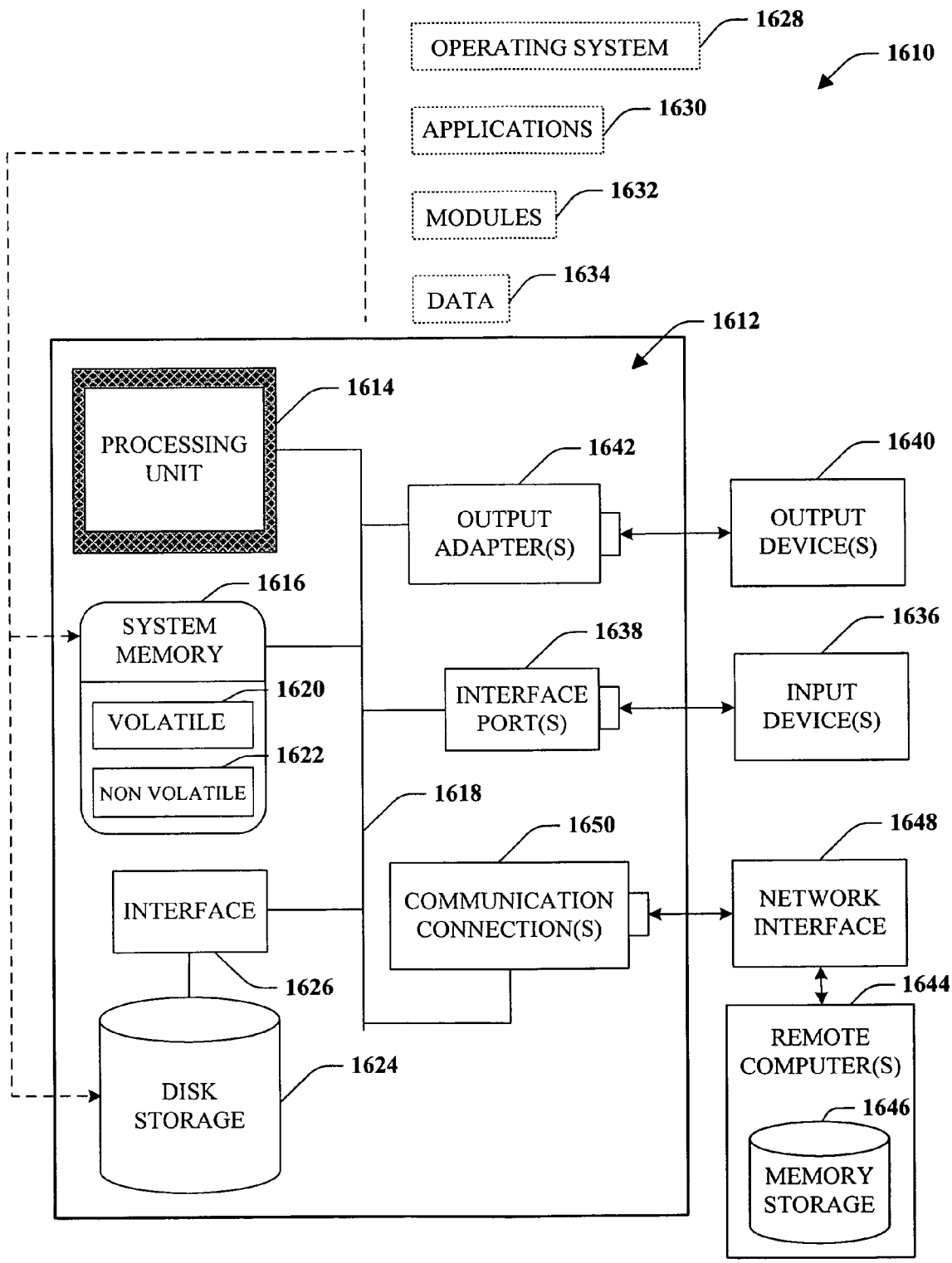
FIG. 16 is a schematic block diagram illustrating a suitable operating environment for aspects of the subject innovation.
Figure 17:
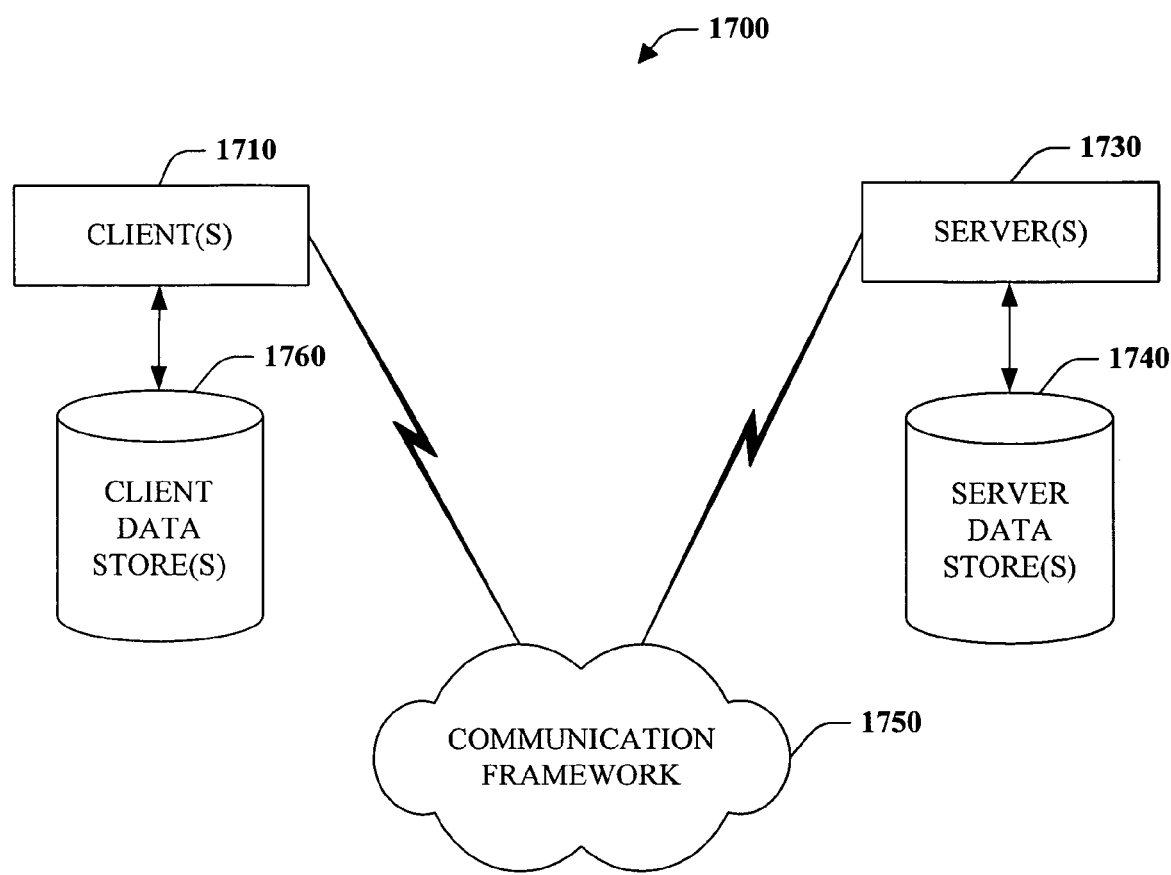
FIG. 17 is a schematic block diagram of a sample-computing environment.

In order to provide a context for the various aspects of the disclosed subject matter, FIGS. 16 and 17 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 16, an exemplary environment 1610 for implementing various aspects disclosed herein includes a computer 1612 (e.g., desktop, laptop, server, hand held, programmable consumer or industrial electronics . . . ). The computer 1612 includes a processing unit 1614, a system memory 1616, and a system bus 1618. The system bus 1618 couples system components including, but not limited to, the system memory 1616 to the processing unit 1614. The processing unit 1614 can be any of various available microprocessors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example, disk storage 1624. Disk storage 1624 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the present invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612 and to output information from computer 1612 to an output device 1640. Output adapter 1642 is provided to illustrate that there are some output devices 1640 like displays (e.g., flat panel and CRT), speakers, and printers, among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereof, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1616, it can also be external to computer 1612. The hardware/software necessary for connection to the network interface 1648 includes, for exemplary purposes only, internal and external technologies such as, modems including regular telephone grade modems, cable modems, power modems and DSL modems, ISDN adapters, and Ethernet cards or components.

FIG. 17 is a schematic block diagram of a sample-computing environment 1700 with which the subject innovation can interact. The system 1700 includes one or more client(s) 1710. The client(s) 1710 can be hardware and/or software (e.g., threads, processes, computing devices). The system 1700 also includes one or more server(s) 1730. Thus, system 1700 can correspond to a two-tier client server model or a multi-tier model (e.g., client, middle tier server, data server), amongst other models. The server(s) 1730 can also be hardware and/or software (e.g., threads, processes, computing devices). The servers 1730 can house threads to perform transformations by employing the subject innovation, for example. One possible communication between a client 1710 and a server 1730 may be in the form of a data packet transmitted between two or more computer processes.

The system 1700 includes a communication framework 1750 that can be employed to facilitate communications between the client(s) 1710 and the server(s) 1730. The client(s) 1710 are operatively connected to one or more client data store(s) 1760 that can be employed to store information local to the client(s) 1710. Similarly, the server(s) 1730 are operatively connected to one or more server data store(s) 1740 that can be employed to store information local to the servers 1730. By way of example and not limitation, the client 1710 can correspond to the analyzer component 120, which can communicate with server 1730 to retrieve or otherwise interact with a remotely stored map component on store 1740.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. An input recognition system comprising:
a keypad comprising a set of keys that includes a predefined hotkey;
a hotkey detection component that identifies a single actuation of the predefined hotkey as indicating the start of a first sequence of key activations corresponding to a first pattern that is being input into the keypad for recognizing a first character, and two actuations of the predefined hotkey as indicating an end of the first sequence of key activations;
a timer configured to cooperate with the hotkey detection component for detecting a pattern boundary that distinguishes the first sequence of key activations corresponding to the first pattern from a second sequence of key activations corresponding to a second pattern when a user fails to indicate a completion of the first sequence of key activations;
an input component that acquires input data corresponding to said first sequence of key activations; and
an analysis component that receives the input data from the input component and recognizes the first character based on interpreting said first pattern as corresponding to a visual representation of the first character superimposed over the set of keys.

2. The system of claim 1, wherein the keypad is a numeric keypad.

3. The system of claim 1, wherein the character is a character belonging to the Hangul alphabet.

4. A data input method comprising:
pre-defining hotkey from amongst a plurality of keys on a keypad;
actuating the hotkey once to indicate that a first key activation sequence corresponding to a first pattern will be executed on the keypad after the one depression of the hotkey;
executing the first key activation sequence thereafter by sequentially activating a first set of keys on the keypad, the first set of keys selected in conformance to the first pattern that is a visual representation of a desired character superimposed over the plurality of keys;
receiving from the keypad, input data corresponding to the sequential activation of the first set of keys;
monitoring the keypad for detecting two sequential actuations of the hotkey as an indication that the first key activation sequence has been completed; and
analyzing the input data to identify from the first pattern, the desired character.

5. The method of claim 4, wherein the desired character is a letter of an alphabet, and further wherein analyzing the data comprises interpreting a minimum of two key activations as representing a segment of the letter of the alphabet.

6. The method of claim 4, wherein analyzing the input data comprises mapping received input data to a map to identify the desired character.

7. The method of claim 4, further comprising displaying the desired character after identification.

8. The method of claim 4, further comprising:
displaying potential pattern matches as the input data is being analyzed; and
receiving in response to displaying the potential pattern matches, input data indicating a selection of a first pattern match.

9. The method of claim 4, wherein the input data comprises a sequence of numbers corresponding to the first set of keys.

10. The system of claim 1, wherein the analysis component includes
a prognostic component that predicts said pattern boundary based at least in part on historical information, and wherein the prognostic component interacts with the timer component to learn user input habits to facilitate identification of said first and second sequences.

11. The system of claim 1, wherein none of the individual keys in the set of keys are predefined to specifically and wholly represent an individual alphabet of a desired language.

12. The system of claim 1, wherein the analysis component comprises a prognostic component for recognizing a segment of the character based on historical information derived from previous key activations.

13. The method of claim 4, wherein the desired character is one of a letter of an alphabet, a signature, or an emoticon.

14. The method of claim 4, wherein the desired character is a first letter in an alphabet of a desired language, and wherein analyzing the input data comprises recognizing the first letter on the basis that each individual key in the plurality of keys is configured to preclude a one-to-one mapping of the individual key to an individual letter of the alphabet of the desired language.

* * * * *

UNITED STATES PATENT AND TRADEMARK OFFICE
CERTIFICATE OF CORRECTION

PATENT NO. : 7,961,903 B2  Page 1 of 1
APPLICATION NO. : 11/339171
DATED : June 14, 2011
INVENTOR(S) : Heon Min Lim It is certified that error appears in the above-identified patent and that said Letters Patent is hereby corrected as shown below:

In column 14, line 21, in Claim 4, after "pre-defining" insert -- a --.

Signed and Sealed this
Thirtieth Day of August, 2011

David J. Kappos
*Director of the United States Patent and Trademark Office*